(12) United States Patent
Furukawa et al.

(10) Patent No.: US 10,663,439 B2
(45) Date of Patent: May 26, 2020

(54) ANALYSIS METHOD AND ANALYSIS DEVICE FOR SUBSTANCE TO BE MEASURED

(71) Applicants: PerkinElmer Japan Co., Ltd., Yokohama-shi, Kanagawa (JP); National University Corporation Fukushima University, Fukushima-shi (JP)

(72) Inventors: Makoto Furukawa, Fujisawa (JP); Yoshitaka Takagai, Fukushima (JP)

(73) Assignees: PerkinElmer Japan Co., Ltd., Yokohama-shi, Kanagawa (JP); National University Corporation Fukushima University, Fukushima-shi, Fukushima (JP)

( * ) Notice: Subject to any disclaimer, the term of this patent is extended or adjusted under 35 U.S.C. 154(b) by 0 days.

(21) Appl. No.: 16/091,509

(22) PCT Filed: Apr. 4, 2017

(86) PCT No.: PCT/JP2017/014074
§ 371 (c)(1),
(2) Date: Oct. 4, 2018

(87) PCT Pub. No.: WO2017/175757
PCT Pub. Date: Oct. 12, 2017

(65) Prior Publication Data
US 2019/0128860 A1    May 2, 2019

(30) Foreign Application Priority Data
Apr. 5, 2016    (JP) .................................. 2016-075872

(51) Int. Cl.
*G01N 30/88*    (2006.01)
*G01N 30/10*    (2006.01)
(Continued)

(52) U.S. Cl.
CPC .............. *G01N 30/88* (2013.01); *G01N 30/00* (2013.01); *G01N 30/02* (2013.01); *G01N 30/08* (2013.01);
(Continued)

(58) Field of Classification Search
CPC ................................................ G01N 2030/889
See application file for complete search history.

(56) References Cited

U.S. PATENT DOCUMENTS 3,686,923 A * 8/1972 Favre ...................... G01N 30/10
                                                                73/23.37
4,131,427 A * 12/1978 Karp ....................... G01N 21/53
                                                                210/656
(Continued)

FOREIGN PATENT DOCUMENTS

JP        59-151897 A    8/1984
JP        07-055783 A    3/1995
(Continued)

OTHER PUBLICATIONS

International Search Report dated Jun. 27, 2017 in connection with Application No. PCT/JP2017/014074.
(Continued)

*Primary Examiner* — Daniel S Larkin
(74) *Attorney, Agent, or Firm* — Christensen O'Connor Johnson Kindness PLLC (57) ABSTRACT

An analysis method for a substance to be measured, including (a) introducing a sample into a flow channel having a bypass, flow channel and introducing the sample introduced into the bypass flow channel into a measuring device so as to measure signal intensity or concentration of a substance to be measured and/or a carrier in the sample; (b) introducing a sample that has not been introduced into the bypass flow channel into a column so as to adsorb the substance to
(Continued)

be measured and/or the carrier; and (c) introducing an eluate into the column, eluting the substance to be measured and/or the carrier adsorbed on the column, and introducing the substance and/or the carrier into the measuring device so as to measure the signal intensity or concentration of the eluted substance to be measured and or the carrier.

5 Claims, 5 Drawing Sheets (51) Int. Cl.
    *G01N 30/08*     (2006.01)
    *G01N 30/26*     (2006.01)
    *G01N 30/00*     (2006.01)
    *G01N 30/86*     (2006.01)
    *G01N 30/02*     (2006.01)
    *G01N 30/84*     (2006.01)

(52) U.S. Cl.
    CPC ............. *G01N 30/10* (2013.01); *G01N 30/26* (2013.01); *G01N 30/84* (2013.01); *G01N 30/86* (2013.01); *G01N 2030/085* (2013.01); *G01N 2030/889* (2013.01)

(56) References Cited

U.S. PATENT DOCUMENTS

| | | | |
|---|---|---|---|
| 5,801,302 A * | 9/1998 | Riviello | ................. G01N 30/16 73/61.55 |
| 2006/0093521 A1 | 5/2006 | Swartz et al. | |
| 2015/0047442 A1 | 2/2015 | Aono | |
| 2016/0011155 A1 | 1/2016 | Klein | |
| 2016/0320362 A1 * | 11/2016 | Schwieters | ........ G01N 33/0013 |

FOREIGN PATENT DOCUMENTS

| | | |
|---|---|---|
| JP | 09-145699 A | 6/1997 |
| JP | 2006-204998 A | 8/2006 |
| WO | WO 2015/063886 A1 | 5/2015 |
| WO | WO 2015/094095 A1 | 6/2015 |

OTHER PUBLICATIONS

Japanese Office Action dated Feb. 28, 2017 in connection with Application No. 2016-075872.
Takeuchi, T., et al., "Split Flow and Bypass Flow Systems for Monolithic Capillary Columns in Liquid Chromatography," Journal of Chromatography A, 1021:55-59, XP004471337, Dec. 2003.
Extended European Search Report dated Nov. 22, 2019, issued in corresponding International Application No. PCT/JP2017/014074, filed Apr. 4, 2017, 8 pages.

* cited by examiner

ANALYSIS METHOD AND ANALYSIS DEVICE FOR SUBSTANCE TO BE MEASURED

RELATED APPLICATIONS

This Application is a national stage filing under 35 U.S.C. § 371 of International Patent Application No. PCT/JP2017/014074, filed Apr. 4, 2017, which claims benefit on Japanese Application No. 2016-075872, filed Apr. 5, 2016, each of which is herein incorporated herein by reference in its entirety.

BACKGROUND ART

For the purpose of purification, analysis, or the like of a substance to be measured in a sample, separation and/or purification or concentration has been widely performed on the substance to be measured using a column (for example, refer to Patent Document 1). In such separation and/or purification or concentration, a recovery rate by the column, of the substance to be measured may be used.

For example, in a case where quantitative analysis of the substance to be measured in the sample is performed after separation and/or purification or concentration, of the substance to be measured using the column, a measured value may be corrected by the recovery rate of a specific substance by the column for the purpose of farther improving the accuracy of quantification.

CITATION LIST

Patent Literature

[PTL 1] Japanese Unexamined Patent Application, First Publication No. 2006-204998

SUMMARY OF INVENTION

Technical Problem

However, in order to determine the recovery rate of the substance to be measured by the column, it is necessary to calculate the concentration of the substance to be measured in the sample before it is introduced into the column and the concentration of the substance to be measured which is separated, purified, concentrated and eluted by the column, that is, it is necessary to measure the concentrations of the substance to be measured in the sample that has been introduced into the column, which is complicated in some cases.

Further, when the column is used as a preliminary stage of quantitative analysis of the substance to be measured, other reagents such as a surrogate, an internal standard substance, and the like may be added to the sample. In such a case, it is accessary to quantitatively analyze the surrogate, the internal standard substance, and the like in the sample before and after it is introduced into the column in the same manner as described above, which is very complicated in some cases.

In this regard, an object of the present invention is to provide a technique that enables easy measurement of the recovery rate of the substance to be measured in separation and/or purification, or concentration of the substance to be measured in the sample by the column.

Solution to Problem

The present invention includes the following aspects.

[1] An analysis method for a substance to be measured, including: (a) a step of introducing a sample into a flow channel having a bypass flow channel and introducing the sample introduced into the bypass flow channel into a measuring device so as to measure signal intensity or concentration of a substance to be measured and/or a carrier in the sample; (b) a step of introducing a sample that has not been introduced into the bypass flow channel into a column so as to adsorb the substance to be measured and/or the carrier; and (c) a step of introducing an eluent into the column, eluting the substance to be measured and/or the carrier adsorbed on the column, and introducing the substance and/or the carrier into the measuring device so as to measure the signal intensity or concentration of the eluted substance to be measured and or the carrier.

[2] The analysis method for a substance to be measured according to [1], further including (d) a step of calculating a recovery rate of the substance to be measured based on the signal intensity or concentration of the substance to be measured and/or the carrier which is measured in the step (a) and the signal intensity or concentration of the substance to be measured and/or the carrier which is measured in the step (c).

[3] The analysis method for a substance to be measured according to [2], further including (e) a step of correcting the signal intensity or concentration of the substance to be measured which is measured in the step (c) based on the recovery rate calculated in the step (d).

[4] The analysis method for a substance to be measured according to any one of [1] to [3], which continuously performs the steps (a) to (c).

[5] The analysis method for a substance to be measured according to any one of [1] to [4], in which the amount of the sample introduced into the bypass flow channel with respect to the amount of the sample introduced into the flow channel is 1 to 50 v/v %.

[6] An analysis device including: a column; an introduction flow channel for introducing a sample into the column; a discharge flow channel for discharging contents from the column; a measuring device connected to the discharge flow channel; and a bypass flow channel that connects the introduction flow channel and the measuring device without passing through the column.

[7] The analysis device according to [6], in which the amount of the sample introduced into the bypass flow channel with respect to the amount of the sample introduced into the introduction flow channel is 1 to 50 v/v %.

[8] The analysis device according to [6] or [7], in which the column is an adsorption column for adsorbing a substance to be measured and/or a carrier in the sample.

Advantageous Effects of Invention

According to the present invention, in the separation and/or purification or concentration of the substance to be measured by the column, it is possible to easily measure the recovery rate of the substance to be measured. In addition, it is possible to correct the measured value based on the recovery rate and perform more accurate quantitative analysis. Further, in a series of analyses, simultaneous quantitative analysis of the substance to be measured in a solution before and after the step of separating and purifying, or concentrating the substance to be measured by the column can be performed.

DESCRIPTION OF EMBODIMENTS

Hereinafter, embodiments of the present invention will be described in detail with, reference to the accompanying drawings. In the drawings, the same or corresponding parts are denoted by the same or corresponding reference numerals, and redundant description wilt be omitted. Dimensional ratios in the respective figures are exaggerated for the sake of explanation, and do not necessarily coincide with actual ratios.

[Analysis Method in the Related Art]

Figure 1:
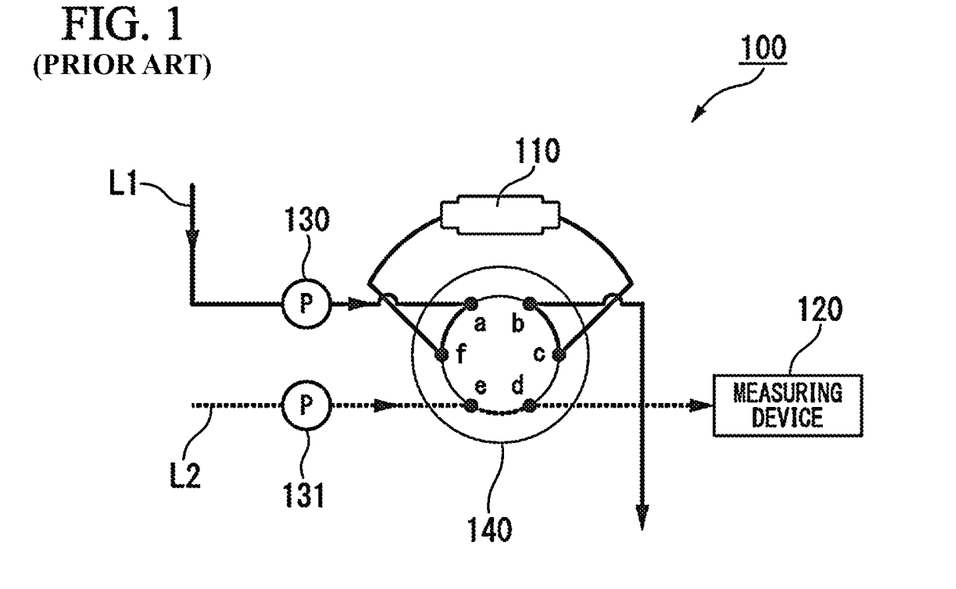
FIG. 1 is a schematic view illustrating the analysis device in the related art.
Figure 2:
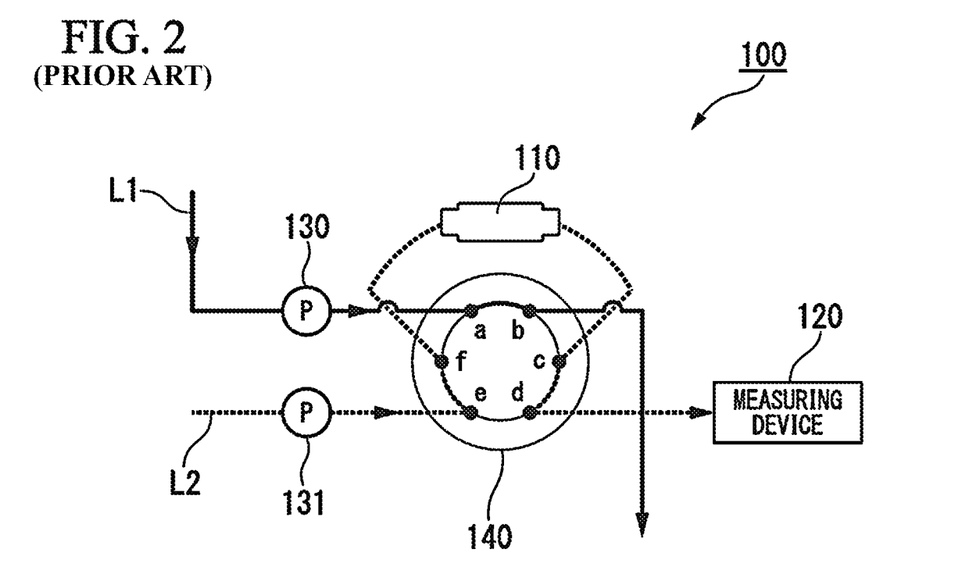
FIG. 2 is a schematic view illustrating the analysis device in the related art.

First, a procedure for separating and purifying a substance to be measured in a sample and calculating a recovery rate by a method in the related, art will be described. FIGS. 1 and 2 are schematic views illustrating an analysis device in the related art. As illustrated in FIGS. 1 and 2, an analysis device 100 is provided with a column 110, a measuring device 120, feed pumps 130 and 131, a six-port valve 140 including ports a to f and flow channels L1 and L2. The column 110 is an adsorption column for adsorbing the substance to be measured in the sample.

(Adsorbing Substance to be Measured onto Column)

First, the six-port valve 140 is set as the connection illustrated in FIG. 1, Subsequently, the sample is introduced into the column 110 through the flow channel L1. The sample is sent by the pump 130 and introduced into the column 110 through the a port and the f port of the six-port valve 140. The substance to be measured in the sample introduced into the column 110 is adsorbed onto the resin with which the column 110 is filled.

In addition, in a case where other reagents such as a surrogate, an internal standard substance, and a carrier that promotes formation of trace amounts of precipitation concerning the substance to be measured are added to the sample (hereinafter, other reagents such as the surrogate, the internal standard substance, the carrier are referred to as a "carrier" in some cases), the carrier in the sample introduced into the column 110 is also adsorbed onto the resin with which the column 110 is filled.

Subsequently, the solution that has passed through the column 110 is discharged through the c port and the b port of the six-port valve 140.

Thereafter while maintaining the connection of the six-port valve, a washing liquid may be introduced into the column 110 through the flow channel L1. As a result, contaminants other than the substance to be measured (and the carrier) remaining in the column 110 can be discharged from the column 110.

(Elution and Measurement of Substance to be Measured from Column)

Subsequently, the substance to be measured (and the carrier) adsorbed onto the column 110 is eluted. First, the six-port valve 140 is set as the connection illustrated in FIG. 2. Subsequently, the eluent is introduced into the column 110 through the flow channel L2. The eluent is sent by the pump 131 and introduced into the column 110 through the e port and the f port of the six-port valve 140. Subsequently, the eluate that has been discharged from the column 110 is introduced into the measuring device 120 through the c port and the d port of the six-port valve 140. Subsequently, the signal intensity or the concentration of the substance to be measured (and/or the carrier) in the eluate is measured by the measuring device 120.

(Calculation of Recovery Rate)

A so-called recovery rate includes a recovery rate and a relative recovery rate. First, the recovery rate will be described, and the relative recovery rate will be described later. The recovery rate of the substance to be measured can be calculated by Expression (1).

Recovery rate (%)=total amount of substance to be measured or carrier eluted from column/total amount of substance to be measured or carrier introduced into column×100     (1)

"Total amount of substance to be measured or carrier eluted from column" in Expression (1) can be calculated by applying the signal intensity of the substance to be measured or the carrier measured by the above-described measuring device 120 to the calibration curve prepared in advance.

However, in order to calculate, the recovery rate of the substance to be measured in the above-described separation and/or purification, a value of "total amount of substance to be measured or carriers introduced into column" itself is insufficient. Therefore, it is necessary to separately measure the concentration of the substance to be measured or carrier in the sample, which is complicated.

[Analysis Method for Substance to be Measured]

Next, the analysis method according to the first embodiment of the present invention will be described. In the first embodiment, the present invention provides an analysis method for a substance to be measured, including: (a) a step of introducing a sample into a flow channel having a bypass low channel and introducing the sample introduced into the bypass flow channel into a measuring device so as to measure signal intensity or concentration of a substance to be measured and/or a carrier in the sample; (b) a step of introducing a sample that has not been introduced into the bypass flow channel into a column so as to adsorb the substance to be measured and/or the carrier; and (c) a step of introducing an eluent into the column, elating the substance to be measured and/or carrier adsorbed on the column, and introducing the substance and/or the carrier into the measuring device so as to measure the signal intensity or concentration of the eluted substance to be measured and/or the carrier. According to the analysis method of this embodiment, in the separation and/or purification or concentration of the substance to be measured by the column, it is possible to easily measure the recovery rate of the substance to be measured.

In addition, according to the analysis method of this embodiment, the recovery rate can be measured simultaneously with the measurement of the substance to be measured, and thus it is possible to correct the error of the quantitative value due to the recovery rate. Further, in a series of measurements, simultaneous quantitative analysis of the substance to be measured in a solution before and after the step of separating and purifying, or concentrating, the substance to be measured by the column can be performed.

In the analysis method of this embodiment, the substance to be measured is not particularly limited as long as it is a substance to be measured that can be adsorbed onto and purified in the column, and examples thereof include an organic compound, an inorganic compound, an ion, a particle, a protein, a low molecular weight compound, a stable isotope, and a radioactive isotope. The substance to be measured may be, for example, strontium 90 which is a radioactive isotope.

Figure 3:
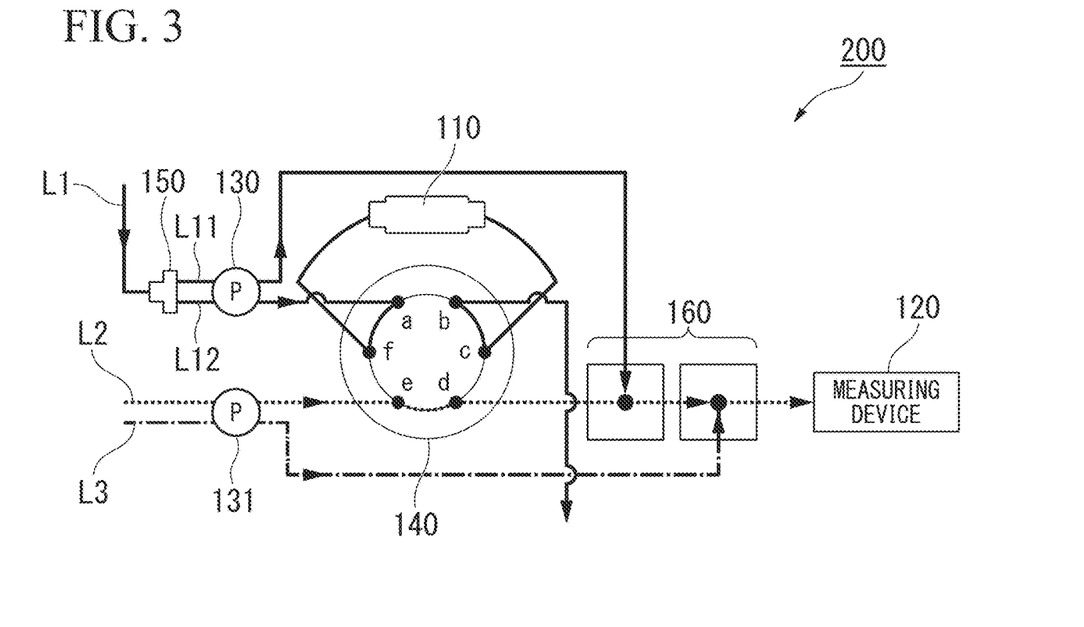
FIG. 3 is a schematic view illustrating a first embodiment of the analysis device of the present invention.
Figure 4:
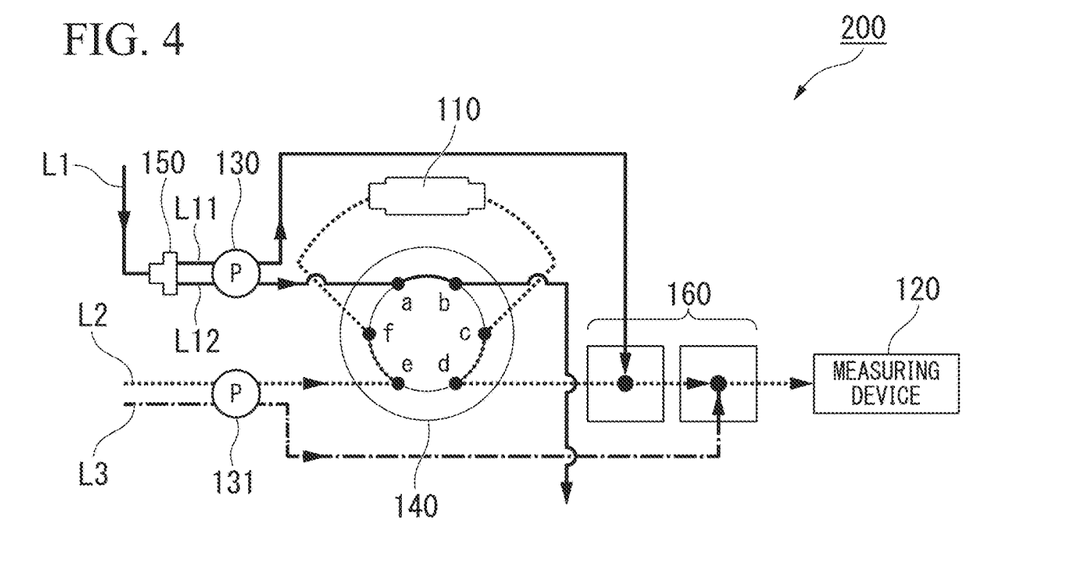
FIG. 4 is a schematic view illustrating a first embodiment of the analysis device of the present invention.

The procedure for separating and purifying, and concentrating the substance to be measured in the sample by the analysis method of this embodiment and calculating the recovery rate will be described below. FIGS. 3 and 4 are schematic views for illustrating an example of an analysis device used in a detection method of this embodiment. As illustrated in FIGS. 3 and 4, an analysis device 200 includes a column 110, a measuring device 120, feed pumps 130 and 131, a six-port valve 140 including ports a to f, a splitter 150, a mixer 160, and flow channels L1, L2, L3, L11, and L12. The column 110 is an adsorption column for adsorbing the substance to be measured in the sample. The analysis device illustrated in FIGS. 3 and 4 is an example, and it is possible to change the arrangement of each constituent element, the number of constituent elements, and the like, as necessary.
(Steps (a) and (b))

First, the six-port valve 140 is set to the connection as illustrated in FIG. 3. Subsequently, the sample is introduced through the flow channel L1. The introduced sample is sent by the pump 130 and branched to the flow channel L11 and the flow channel L12 by the splitter 130. The flow channel L11 is a bypass flow channel that connects, the flow channel L1 and the measuring device 120 without passing through the column 110.

The amount of the sample distributed to the flow channel 111 by the splitter 150 may be appropriately set according to a target to be measured, and may be 1 to 50 v/v %, for example. For example, die flow rate of the sample introduced into the flow channel L1 may be 6.84 mL/min and the flow rate of the sample distributed to the flow channel L11 may be 0.14 mL/min. In this case, the amount of the sample introduced into the bypass flow channel L11 with respect to the amount of the sample introduced into the flow channel L1 is 0.14/6.84×100≈2.0 (v/v %).

The method of controlling the amount of the sample is not particularly limited, and it may be controlled by, for example, a pipe inner diameter of the flow channel, or by controlling each pump by using a plurality of pumps. By setting the amount of the sample distributed to the flow channel L11 to be 1 to 50 v/v %, it is possible to efficiently measure the sample in the bypass flow channel even with a small amount of the sample.

Since the sample flowing through the flow channel L11 is not concentrated by the column, the amount of the sample distributed to the flow channel L11 is preferably small from the viewpoint of high sensitivity analysis. In addition, if the amount of the sample passing through the measuring device 120 before step (c) is small, a risk of contamination of the measuring device 120 is decreased and the measurement accuracy of the measuring device 120 tends to be maintained.

On the other hand, from the viewpoint of the measurement accuracy in step (a), it is necessary to secure a quantity of the sample more than a certain level. By setting the amount of the sample distributed to the flow channel L11 within the above range, it is possible to secure the measurement accuracy in step (a) without increasing the risk of contamination of the measuring device 120.

The sample introduced info the flow channel L11 introduced into the measuring deuce 120 through the mixer 160. Subsequently, the signal intensity of the substance to be measured or the carrier in the sample is measured by the measuring device 120. In addition, it is possible to calculate the concentration based on the measured signal intensity.

Here, an appropriate buffer or diluent may be sent by the pump 131 through the flow channel L2, and introduced into the mixer 160 through the e port and the d port of the six-port valve 140. In this way, it is possible to dilute the sample introduced into the flow channel L11 to an appropriate concentration and introduced into the measuring device 120 at an appropriate flow rate together with the flow channel L2.

In addition, a substance serving as an internal standard may be sent by the pump 131 through the flow channel L3 and introduced into the measuring device 120 through the mixer 160. In this way, it is possible to further improve the measurement accuracy of the substance to be measured or the carrier by calibrating the measured value by the measuring device 120 using the internal standard substance.

On the other hand, the sample distributed to the flow channel L12 by the splitter 150 is introduced into the column 110 through the a port and the f port of the six-port valve 140. Subsequently, the sample that has passed through the column 110 is discharged through the c port and the b port of the six-port valve 140. The substance to be measured or the carrier in the sample introduced into the column 110 is adsorbed by the resin with which the column 110 is filled.

Thereafter, while maintaining the connection of the six-port valve, a washing liquid may be introduced into the column 110 through the flow channels L1, L11 and L12. As a result, contaminants other than the substance to be measured or the carrier remaining in the column 110 can be discharged from the column 110 and the bypass flow channel can be cleaned.
(Step (c))

Subsequently, the substance to be measured or the carrier adsorbed onto the column 110 is eluted. First, the six-port valve 140 is set to the connection as illustrated in FIG. 4. Subsequently, the eluent is introduced into the column 110 through the flow channel L2. The eluent is sent by the pump 131 and introduced into the column 110 through the e port and the f port of the six-port valve 140. Subsequently, the eluate that has been discharged from the column 110 is introduced into the measuring device 120 through the c port and the d port of the six-port valve 140, and the mixer 160. Subsequently, the signal intensity of the substance to be measured or the carrier in the eluate is measured by the measuring device 120. In addition, it is possible to calculate the concentration based on the measured signal intensity.

Here, a substance serving as an internal standard may be sent by the pump 131 through the flow channel L3 and introduced into the measuring device 120 through the mixer 160. In this way, it is possible to further improve the measurement accuracy of the substance to be measured by calibrating the measured value by the measuring device 120 using the internal standard substance.

Further, in step (c), a very small amount of the washing liquid can be sent to the flow channel L1 within a range where there is no problem in the measurement accuracy. The washing liquid may be, for example, the same component as the eluent. As a result, the risk of contamination of the flow channel L1 can be reduced, and washing steps of the flow channels L1 and L12 can be performed concurrently with step (c). Therefore, the measurement using the subsequent sample can be efficiently started after completion of step (c).

(Calculation of Recovery Rate)

The analysis method of this embodiment may be further provided with a step (d) of calculating the recovery rate of the substance to be measured. As described above, the recovery rate of the substance to be measured can be calculated by Expression (1).

Recovery rate (%)=total amount of substance to be measured or carriers eluted from column/total amount of substance to be measured or carriers introduced into column×100 (1)

"Total amount of substance to be measured or carrier introduced into column" in Expression (1) can be calculated based on the signal intensity or the concentration of the substance to be measured or the carrier in the sample distributed to the flow channel L11, and the volume of sample that is distributed to the flow channel L12 and introduced into the column 110, in the analysis method described above. In addition, "total amount of substance to be measured or carrier eluted from column" in Expression (1) can be calculated based on the signal intensity or the concentration of the substance to be measured or the carrier measured by introducing the eluate discharged from the column 110 into the measuring device 120, and the volume of eluent introduced into the column 110. The concentration can be calculated by applying the signal intensity obtained by the measuring device to the calibration curve prepared in advance. Here, it is also possible to obtain the recovery rate by "signal intensity" instead of "concentration". Details will be described later. Note that, under the measurement conditions such as the flow speed being different depending on the flow channel such as the flow channel L11 and the flow channel L12, the condition correction such as adding the flow speed may be appropriately performed.

In the analysis method of this embodiment, as a carrier, a substance having properties similar to the substance to be measured (hereinafter, referred to as "similar substance" in some cases) is added to the sample, and the concentration of the similar substance is used so as to calculate the recovery rate. That is, in step (a), the substance to be measured and the carrier may be introduced into the measuring device 120 via the flow channel L11 so as to measure the signal intensity of the substance to be measured and/or the carrier or the concentration based on the signal intensity.

Subsequently, in step (b), the substance to be measured and the carrier are adsorbed onto the column 110. In step (c), the substance to be measured and the carrier adsorbed onto the column 110 may be eluted from the column, and the signal intensity or the concentration of the substance to be measured and the carrier in the eluate may be measured by the measuring device 120.

(Regarding Calibration Curve)

In calculating the recovery rate, it is not absolutely necessary to prepare a calibration curve using a standard solution. The reason for this will be explained. The relationship between signal intensity (y) and concentration (x) of a substance, to be measured which is eluted from a column can be expressed by y=ax+b, where a is a slope and b is an intercept.

On the other hand, the relationship between signal intensity (y') and concentration (x) of a substance to be measured which is introduced into the bypass flow channel can be expressed by y'=a'x+b', where a' is a slope and b' is an intercept.

In a case where the analysis device is calibrated, the signal intensity y or y' is guaranteed at the concentration x of the substance to be measured. Therefore, the relationship (a/a')= (y−b)/(y'−b') is established between the substance to be measured which is eluted from the column and the substance to be measured which is introduced into the bypass flow channel.

Here, a' and a are constant values. Also, in a case where b' and b are also constant values indicating the background, and the signal intensity from the substance to be measured is sufficiently large, that value can be ignored.

At this time, (the signal intensity (y) of the substance to be measured which is eluted from the column/the signal intensity (y') of the substance to be measured which is introduced into the bypass flow channel) indicates a constant value. At the same time, the volume of the sample passing through the column and the volume of the sample introduced into the bypass flow channel are always constant as long as the experimental conditions are fixed.

Therefore, it is possible to calculate the recovery rate by measuring one or more samples which are criteria which is different from the sample to be measured, without preparing the calibration curve in advance by measuring the standard solution in advance, and the labor for measuring the recovery rate can be greatly reduced.

(Calculation of Relative Recovery Rate)

The relative recovery rate (RR) is the relative recovery rate of the target sample when the reference solution is set to 100% recovery rate. First, a known amount of the solution (1) (other than target sample, reference solution) containing the substance to be measured to be the standard (relative index) of the recovery rate is measured with the present device. This solution (1) is not limited to a standard solution of a known concentration, but may be a solution of an unknown concentration. Therefore, if a calibration curve is prepared using a standard solution of a known concentration, this process can be omitted. In order to calculate the quantitative value of the sample, it is necessary to previously add calibration curve information for determining the concentration from the signal intensity using the standard solution to the measuring device.

As a result of this measurement, as described above, the signal intensity ($y'_1$) via the bypass flow channel and the signal intensity ($y_1$) of the solution eluted from the column are obtained, and a constant value $\alpha_n = y_1/y'_1$ can be obtained.

Thereafter, the same amount of the target sample solution (2) containing the substance to be measured is introduced into the present device, and $\alpha_m = y_2/y'_2$ in the measurement of the target sample solution (2) is similarly determined.

In a case of considering the recovery rate of the reference solution as 100, $\alpha_m$ obtained from the target sample solution containing the substance to be measured is equivalent to $\alpha_n$ of the reference solution, but in a case where the recovery has various effects, the value of $\alpha_m$ is less than $\alpha_n$. With this, the relative recovery rate can be calculated as $RR = \alpha_m/\alpha_n \times 100$.

The relative recovery rate can be easily used for extensive comparative evaluation in general measurement work such as the wear degree of a new item of which column information is previously found, an optional reference point, for example, the degree of deterioration from the start of measurement, and comparison with an optional reference solution.

As described above, according to the analysis method of this embodiment, it is not necessary to separately measure the concentration of the substance to be measured or the carrier in the sample, and the recovery rate of the substance to be measured or the carrier can be easily measured. Further, by correcting the quantitative value of the substance to be measured using the recovery rate a more accurate quantitative value can be obtained.

That is, the analysis method of this embodiment may further include (e) a step of correcting the signal intensity or concentration of the substance to be measured and/or the carrier measured in step (c) based on the recovery rate calculated in step (d).

The concentration of the substance to be measured or the carrier in the sample and the concentration of the substance to be measured or the carrier in the eluate are continuously measured under the same conditions. That is, in the analysis method of this embodiment, the above steps (a) to (c) can be carried out continuously. Therefore, it is possible to measure the recovery rate of the substance to be measured with high accuracy.

Further, since the recovery rate can be calculated for each measurement, it is possible to reduce quantitative errors caused by the variation in the recovery rate. In addition, according to the method in the related art, it is difficult to know the upper limit of adsorption of the substance to be measured to the column and the decrease in the recovery rate due to coexisting substance in some cases, but according to the method in this embodiment, these can be easily measured for each sample.

Note that, in some cases, different terms such as an extraction rate, a removal rate, a purification rate, and a column wear degree are used for the recovery rate depending on the purpose; however, in any case of using these terms, the analysis method of this embodiment can be applied, and it is not limited to the "recovery rate".

Modification Example

The analysis method, of this embodiment can also be applied, for example, to purification of the substance to be measured by adsorbing a substance (hereinafter, referred to as "impurity") other than the substance to be measured onto the column.

For example, in step (a), a sample is introduced into a flow channel including a bypass flow channel, and the sample introduced into the bypass flow channel is introduced into a measuring device so as to measure signal intensity or concentration of impurities in the sample.

Further, in step (b), the sample which is not introduced into the bypass flow channel is introduced into the column so as to adsorb impurities. That is, in this modification example, the impurities are adsorbed to the column instead of the substance to be measured (and carrier).

Subsequently, in step (c), the sample discharged from the column is introduced into the measuring device so as to measure the signal intensity or the concentration of impurities in the discharged liquid. Subsequently, an impurity removal rate is calculated by the following Expression (2) based on the signal intensity or the concentration of impurities in the sample before it is introduced into the column introduction and the signal intensity or the concentration of impurities in the discharged liquid from the column.

Impurity removal rate (%)=(1−total amount of impurities in discharged liquid from column/total amount of impurities introduced into column)× 100 (2)

By monitoring the impurity removal rate according to this modification example, it is possible to monitor aged deterioration of the column and the like.

[Analysis Device]

In the first embodiment the present invention provides an analysis device including: a column; an introduction flow channel for introducing a sample into the column; a discharge flow channel for discharging contents from the column; a measuring device connected to the discharge flow channel; and a bypass flow channel that connects the introduction flow channel and the measuring device without passing through the column.

As the analysis device of this embodiment, the above-described, analysis device 200 can be exemplified. The analysis method according to the first embodiment can be implemented by using the analysis device of this embodiment of the present invention. That is, according to the analysis device of this embodiment, in the purification of the substance to be measured by the column, the recovery rate of the substance to be measured can be easily measured.

In the analysis device of this embodiment, the amount of the sample introduced into the bypass flow channel with respect to the amount of the sample introduced into the introduction flow channel may be 1 to 50 v/v %.

In addition, although the analysis device 200 as illustrated in FIGS. 3 and 4 includes the mixer 160 and the flow channel L3, in a case where a buffer is not sent using the flow channel L2 in step (a), or a substance serving as an internal standard is not sent using the flow channel L3, the analysis device 200 may not have one or both of the mixer 160 and the flow channel L3. Further, the analysis device of this embodiment is not limited to the above-described analysis device 200, and any other suitable design change can be made.

The substance to be measured winch is analyzed by the analysis device in this embodiment is not particularly limited as long as it is a substance to be measured that can be adsorbed onto and purified in the column, and examples thereof include an organic compound, an inorganic compound, an ion a particle, a protein, a low molecular weight compound, a stable isotope, and a radioactive isotope. The analysis device of this embodiment may be, for example, for analysis of strontium 90 which is a radioactive isotope.

EXAMPLES

Next, the present invention will be described in more detail with reference to examples, but the present invention is not limited to the following examples.

Example 1

$^{36}$Sr in a sample containing a known concentration of strontium 86 ($^{86}$Sr) was purified with a column as a substance to be measured using a device having the same configuration as the analysis device illustrated in FIGS. 3 and 4, and the recovery rate and the concentration were calculated. More specifically, first, $^{88}$Sr, which is a similar substance having similar properties to $^{86}$Sr and has similar behavior with respect to a column, was added as a carrier to the sample. Since $^{86}$Sr and $^{88}$Sr are in a natural isotope relationship, the other is obvious if one concentration is known, but for demonstration of normal operation of the present invention, they were used as an example.

Subsequently, the sample was branched by a splitter into a flow channel (corresponding to the flow channel L12 in FIGS. 3 and 4) having an inside diameter of 1.14 mm and a bypass flow channel (corresponding to fee flow channel L11 in FIGS. 3 and 4) having an inside diameter of 0.13 mm, and the sample introduced into the bypass flow channel was introduced into the measuring device so as to measure the concentration of the substance to be measured in the sample. In addition, a sample introduced into a channel having an inner diameter of 1.14 mm was introduced into a column to purify and elute strontium $^{86}$Sr, and the concentration of $^{86}$Sr in the eluate was measured. As the column, a strontium recognition resin was used.

As a measuring device, a device using a high frequency inductively coupled plasma mass spectrometer (ICP-MS) as a base was used. More specifically, quantitative analysis was earned out using a collision reaction cell with high purity oxygen supply means and ICP-MS equipped with a quadrapole mass filter while introducing high purify oxygen.

Figure 5:
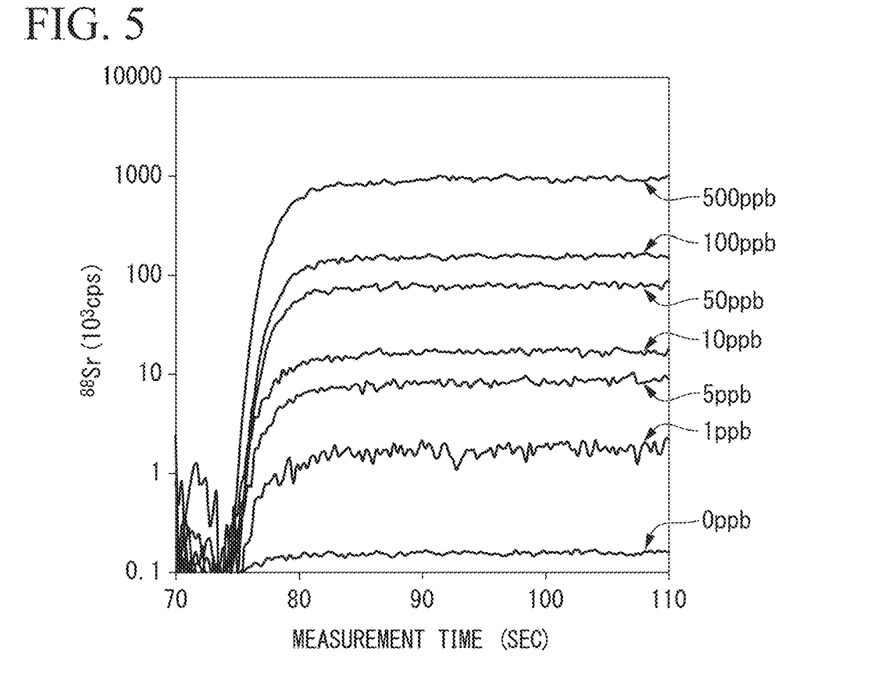
FIG. 5 is a graph illustrating a measurement result (signal intensity data) of a carrier ($^{88}Sr$) introduced into a bypass flow channel in Example 1.
Figure 6:
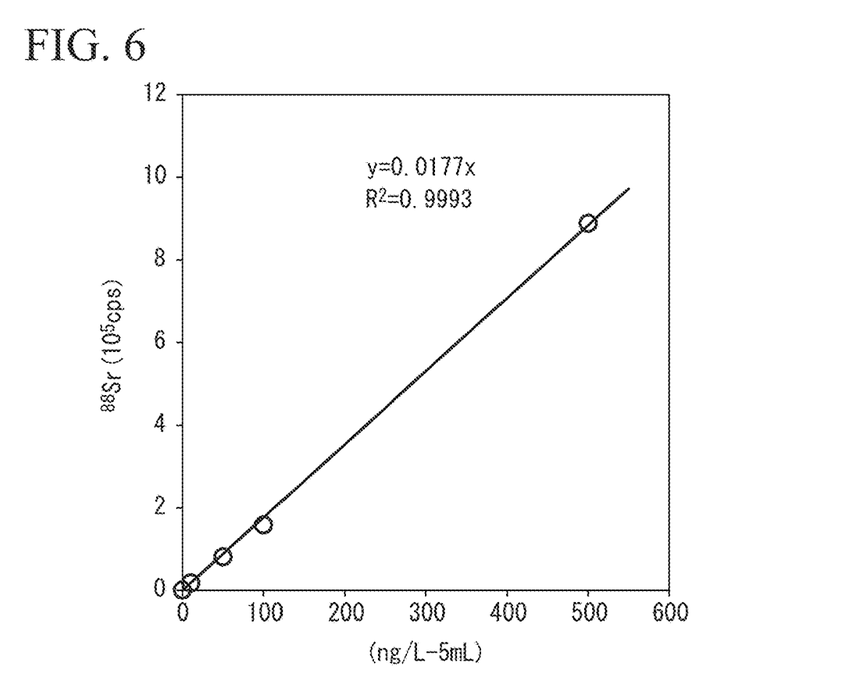
FIG. 6 is a calibration curve illustrating a relationship of concentration and signal intensity of $^{88}Sr$ in Example 1.

FIG. 5 is a graph illustrating a measurement result (signal intensity data) of a carrier ($^{88}$Sr) introduced into a bypass flow channel. FIG. 6 is a calibration curve illustrating a relationship of concentration and signal intensity of $^{88}$Sr.

Note that $^{88}$Sr also acts as an auxiliary agent to facilitate concentration of $^{90}$Sr. $^{88}$Sr was added to the sample as strontium carbonate. In addition, since $^{88}$Sr and $^{90}$Sr exhibit the same behavior with respect to the strontium recognition resin, the recovery rate was calculated by measuring the concentration of $^{88}$Sr.

In Example 2, the recovery rate and the concentration of $^{90}$Sr were calculated in the same manner as used in Example 1 using the above sample. Further, the concentration was corrected by using the recovery rate. As Comparative Example 1, $^{90}$Sr in the same sample as that used in Example 2 was purified by the column using a device having the same configuration as the analysis device illustrated in FIGS. 1 and 2 so as to measure the concentration.

Figure 9:
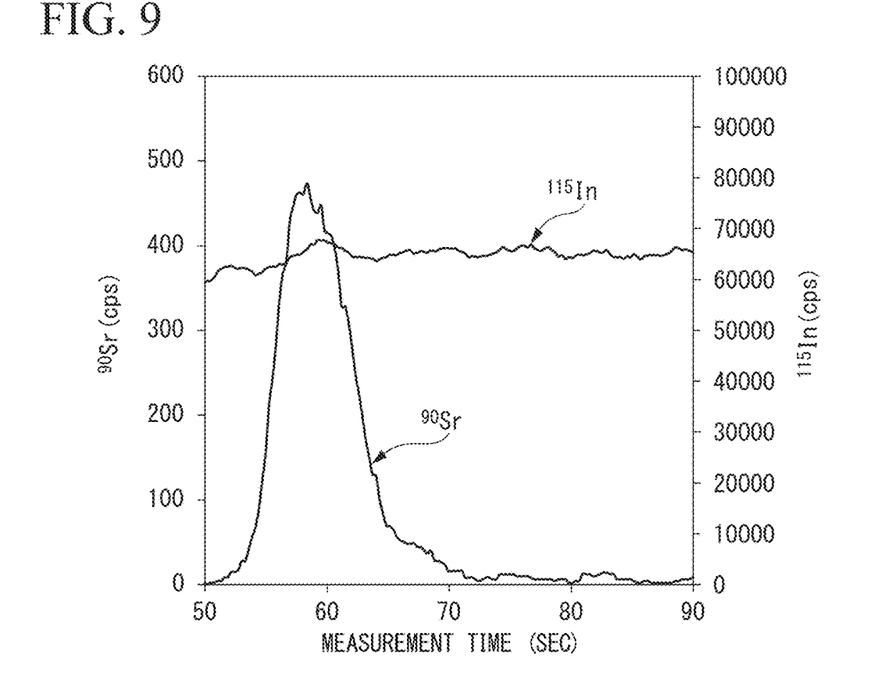
FIG. 9 is a graph illustrating a measurement result (signal intensity data) of $^{90}Sr$ eluted from a column in Example 2.
Figure 10:
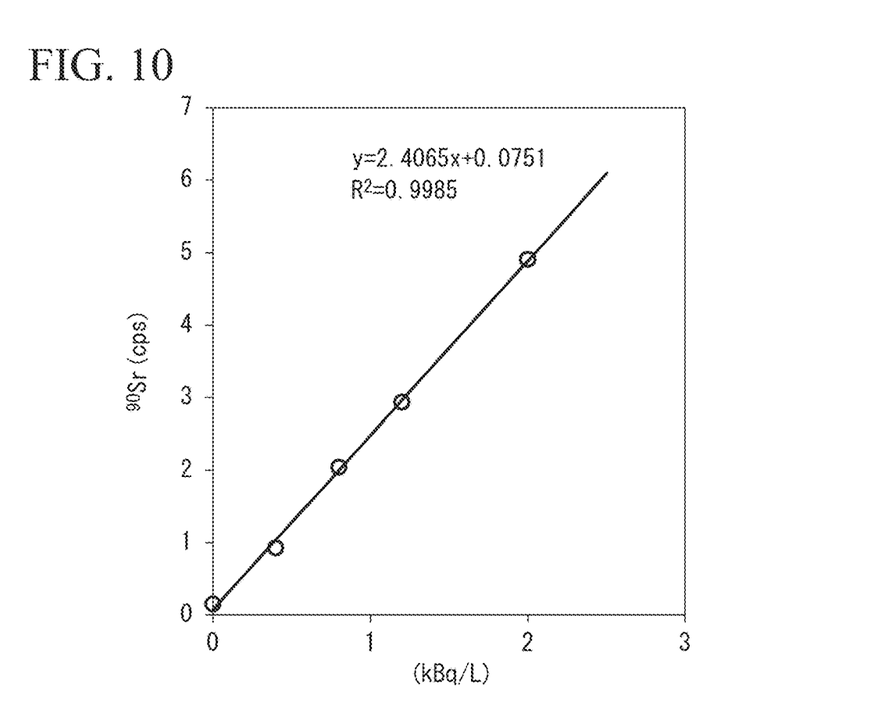
FIG. 10 is a calibration carve illustrating a relationship of concentration and signal intensity of $^{90}Sr$ in Example 2.

FIG. 9 is a graph illustrating a measurement result (signal intensity data) of $^{90}$Sr eluted from a column in Example 2. FIG. 10 is a calibration curve illustrating a relationship of concentration and signal intensity of $^{90}$Sr. The results of Comparative Example 1 and Example 2 are indicated in the following Table 1.

TABLE 1

| | Comparative Example 1 | | Example 2 | | |
|---|---|---|---|---|---|
| Sample | Quantitative value of $^{90}$Sr [Bq/L] | Coincidence ratio with 1200 Bq [%] | Recovery rate of $^{88}$Sr | Quantitative value of $^{90}$Sr corrected by recovery rate [Bq/L] | Coincidence ratio with 1200 Bq [%] |
| Rainwater + $^{90}$Sr (1200 Bq/L) | 915 | 76 | 77 | 1195 | 100 |
| Groundwater + $^{90}$Sr (1200 Bq/L) | 1134 | 94 | 95 | 1188 | 99 |

From FIG. 6, it was confirmed that the signal intensity and the concentration of $^{88}$Sr in the sample represent a good correlation.

Figure 7:
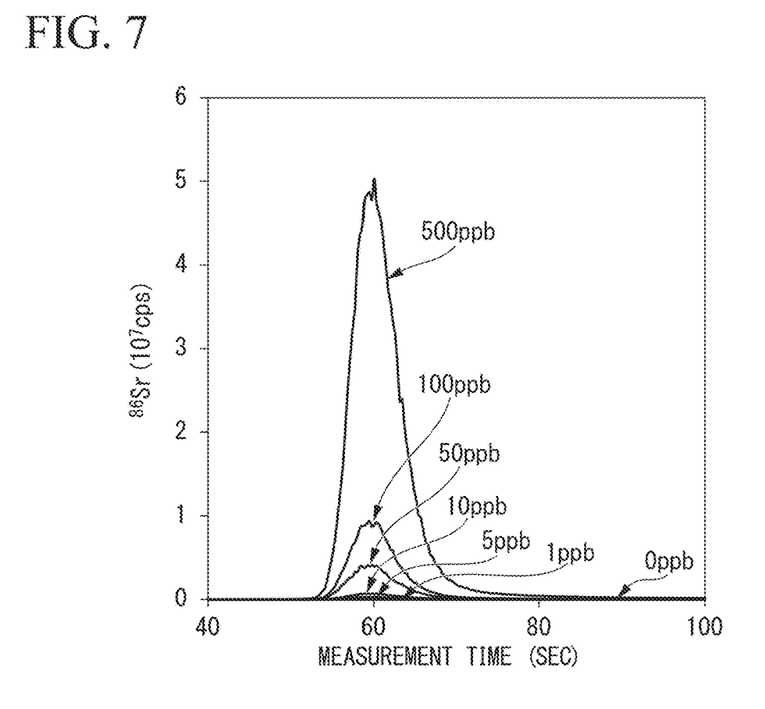
FIG. 7 is a graph illustrating a measurement result (signal intensity data) of $^{86}Sr$ eluted from a column in Example 1.
Figure 8:
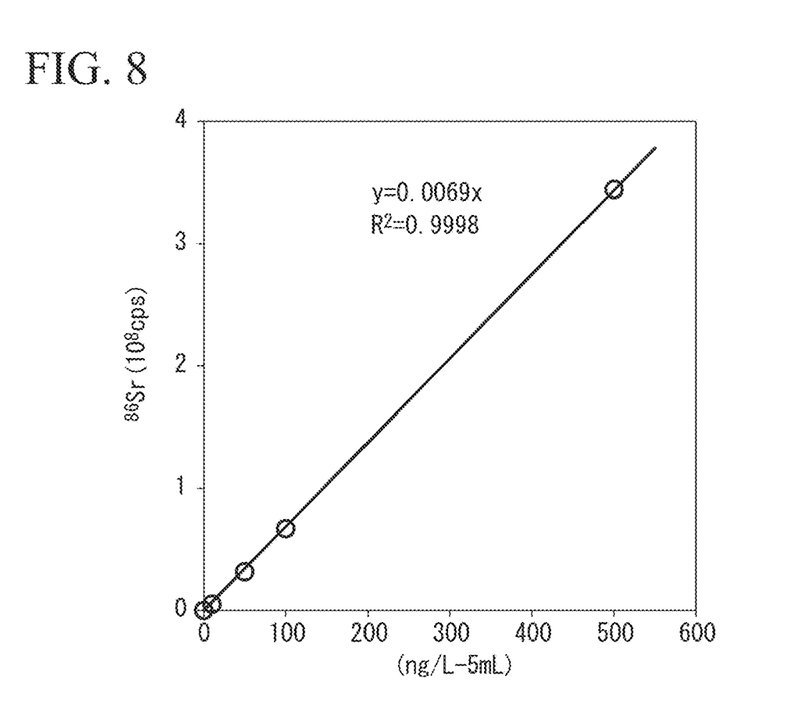
FIG. 8 is a calibration carve illustrating a relationship of concentration and signal intensity of $^{86}Sr$ in Example 1.

FIG. 7 is a graph illustrating a measurement result (signal intensity data) of $^{86}$Sr eluted from a column. FIG. 8 is a calibration curve illustrating a relationship of concentration and signal intensity of $^{86}$Sr. From FIG. 8, it was confirmed that the signal intensity and the concentration of $^{86}$Sr in the sample represent a good correlation.

With respect to the strontium recognition resin used in this example, $^{86}$Sr and $^{86}$Sr exhibit the same behavior, and the signal intensitys thereof are proportional to the concentration. Therefore, from the measurement result of $^{88}$Sr and the measurement result of $^{86}$Sr, the recovery rate is calculated based on Expression (1) and the result of $^{86}$Sr is further corrected by the recovery rate, and thereby the quantitative analysis can be perforated with higher accuracy.

Example 2 and Comparative Example 1

By using the device having the same configuration as the analysis device illustrated in FIGS. 3 and 4, $^{90}$Sr in the sample was purified by the column and the recovery rate and the concentration were calculated. More specifically, a sample in which $^{88}$Sr, which is a similar substance having similar properties to $^{90}$Sr and has similar behavior with respect to a column, and $^{115}$In as the internal standard substance were added as a carrier was used. Note that $^{115}$In was added from the flow channel L3 in FIGS. 3 and 4. For the purpose of verification, rainwater and groundwater whose concentration of $^{90}$Sr was adjusted to 1200 Bq/L were used as samples.

As a result, in Example 2, it was possible to measure the concentration of $^{90}$Sr in the sample before it was introduced into the column, and the concentration and recovery rate of $^{90}$Sr after purification or elution by the column in one measurement, and it was possible to perform quantitative analysis with high accuracy by correcting the concentration by the recovery rate. Specifically, in Comparative Example 1, the measured coincidence ratio of the quantitative value of $^{90}$Sr was 76% or 94%, whereas in Example 2, it was possible to perform quantitative analysis on $^{90}$Sr with the coincidence ratio of 99% or more.

In the samples used in Example 2 and Comparative Example 1, $^{88}$Sr and $^{115}$In were added as a carrier. Here, in order to calculate the recovery rate of $^{90}$Sr by the column using the method in the related art, it is necessary to measure the concentration of the carrier in the sample before it is introduced into the column and the concentration of the carrier that has been purified, concentrated, and eluted in the column, respectively, Here, in a case where the concentration difference between these carriers and $^{90}$Sr as a substance to be measured is large, it is necessary to individually measure the concentration of the earner by the method in the related art with the analysis device using a different principle from the analysis of the substance to be measured. For this reason, the measurement accuracy deteriorates in some cases. On the other hand, by using the analysis device or analysis method of the example, it was possible to suppress such a decrease in the measurement accuracy.

Example 3

About seventy kinds of elements in the sample were measured using a device having the same configuration as the analysis device illustrated in FIGS. 3 and 4.

Examples of the element to be measured include Li, Be, B, Na, Mg, Al, K, Ca, Se, Ti, V, Cr, Mn, Fe, Co, Ni, Cu, Zn, Ga, Ge, As, Se, Rb, Sr, Y, Zr, Nb, Mo, Ru, Rh, Pd, Ag, Cd, In, Sn, Sb, Te, Cs, Ba, La, Ce, Fr, Nd, Sm, Eu, Gd, Tb, Dy, Ho, Br, Tm, Yb, Lu, Hf, Ta, W, Re, Ir, Pt, Au, Hg, Tl, Pb, Bi, Th, U, Si, S, and P. In addition, as the column and the ICP-MS which is a measuring device, the same one as that in Example 1 was used.

As a result, it was possible to simultaneously calculate the adsorption rate and recovery rate of each element to the column. The results of this example demonstrate that by using ICP-MS as the measuring device, it is possible to easily develop into Pa (protactinium), Os (osmium), Pu (plutonium), a radioactive isotope, a stable isotope, a metal complex, a metalloprotein, and an organometallic compound. Further, the method and device of this example can be used for property evaluation of an adsorption column, a separation column, a removal column, a capillary column, and the like regardless of the kinds of the columns.

INDUSTRIAL APPLICABILITY

According to the present invention, in the purification of the substance to be measured by the column, it is possible to easily measure the recovery rate of the substance to be measured.

REFERENCE SIGNS LIST

100, 200 analysis device
110 column
120 measuring device
130, 131 feed pump
140 six-port valve
150 splitter
160 mixer
L1, L2, L3, L11, L12 flow channel
a, b, c, d, e, f port

The invention claimed is:

1. An analysis method for a substance to be measured, comprising:
    (a) introducing a sample into a flow channel having a bypass flow channel and introducing the sample introduced into the bypass flow channel into a measuring device so as to measure signal strength or concentration of a substance to be measured and/or a carrier in the sample;
    (b) introducing a sample that has not been introduced into the bypass flow channel into a column so as to adsorb the substance to be measured and/or the carrier; and
    (c) introducing an eluent into the column, eluting the substance to be measured and/or the carrier adsorbed on the column, and introducing the substance and/or the carrier into the measuring device so as to measure the signal strength or concentration of the eluted substance to be measured and/or the carrier.

2. The analysis method for a substance to be measured according to claim 1, further comprising:
    (d) calculating a recovery rate of the substance to be measured based on the signal strength or concentration of the substance to be measured and/or the carrier which is measured in (a) and the signal strength or concentration of the substance to be measured and/or the carrier which is measured in (c).

3. The analysis method for a substance to be measured according to claim 2, further comprising:
    (e) correcting the signal strength or concentration of the substance to be measured which is measured in (c) based on the recovery rate calculated in (d).

4. The analysis method for a substance to be measured according to claim 1, which continually performs (a) to (c).

5. The analysis method for a substance to be measured according to claim 1,
    wherein the amount of the sample introduced into the bypass flow channel with respect to the amount of the sample introduced into the flow channel is 1 to 50 v/v %.

* * * * *